United States Patent [19]

Duffaud

[11] Patent Number: 5,042,787
[45] Date of Patent: Aug. 27, 1991

[54] PINNING FASTENER WITH INTERNAL MECHANISM

[75] Inventor: Jacques Duffaud, Blagnac, France

[73] Assignee: Aerospatiale Societe National Industrielle, Paris, France

[21] Appl. No.: 325,906

[22] Filed: Mar. 20, 1989

[30] Foreign Application Priority Data

Apr. 1, 1988 [FR] France .................. 88 04392

[51] Int. Cl.⁵ .............................. B23Q 3/00
[52] U.S. Cl. .................................... 269/48.4
[58] Field of Search ............... 269/47, 48.2, 48.3, 269/48.4; 81/121.1

[56] References Cited

U.S. PATENT DOCUMENTS

| | | | |
|---|---|---|---|
| 2,294,013 | 8/1942 | Wallace | 269/48.4 |
| 2,317,315 | 4/1943 | Wallace | 269/48.4 |
| 2,397,892 | 4/1946 | Van Sittert | 269/48.4 |
| 3,289,525 | 12/1966 | Lee | 269/48.3 |
| 4,671,718 | 6/1987 | Eakin | 411/345 |

FOREIGN PATENT DOCUMENTS

| | | |
|---|---|---|
| 198105 | 10/1985 | European Pat. Off. . |
| 161334 | 11/1985 | European Pat. Off. . |
| 789945 | 11/1935 | France . |
| 48048 | 10/1937 | France . |
| 887862 | 8/1943 | France . |
| 1492310 | 7/1967 | France . |
| 413403 | 7/1934 | United Kingdom ............... 269/48.4 |

*Primary Examiner*—J. J. Hartman
*Attorney, Agent, or Firm*—Fisher, Christen & Sabol

[57] ABSTRACT

A fastener is provided for pinning together an assembly of metal sheets or similar, comprising:
a body defining a bearing face, intended to come into contact with the external face of one of said external metal sheets of said assembly,
at least one elongate element intended to pass through facing holes formed in the metal sheets of said assembly and having an engagement nose. Said fastener is further provided with a mechanism comprising a first core able to rotate and slide inside said body and having a threaded portion with which a second threaded core cooperates, with which said elongate element is fast.

6 Claims, 1 Drawing Sheet

PINNING FASTENER WITH INTERNAL MECHANISM

BACKGROUND OF THE INVENTION

1. Field of the Invention

The present invention relates to fasteners for pinning metal sheets or similar plates together.

When preparing the final assembly of metal sheets, for example by riveting, a temporary assembly of said metal sheets is generally formed by means of pinning fasteners passing through facing holes formed therein.

2. Description of the Prior Art

Such metal sheet pinning fasteners are described for example in the French patent FR-A-789 945 of May 13th 1935, in its Certificate of Addition FR-A-48 048 of May 13th 1936 or else in the French patent FR-A-1 492 310 of 8th July 1966.

Known pinning fasteners comprise:

a bearing face intended to come into contact with the external face of one of said external metal sheets of the metal sheet assembly, at least one elongate element intended to pass through facing holes formed in the metal sheets of said assembly and having an engagement nose, and a mechanism for generating a relative movement, in the longitudinal direction, between said elongate element and said bearing face and, possibly, a transverse movement of said engagement nose so that said metal sheets may be pressed between said bearing face and said engagement nose, which is then engaged behind the external face of the other external metal sheet of the assembly, at the edge of the corresponding hole.

Generally, in these known pinning fasteners, said bearing face is the front face of a body through which a threaded rod passes longitudinally bearing said elongate element at its end passing through said front face, whereas said mechanism comprises a nut mounted on the threaded rod, outside said body on the side opposite said front face thereof, a pressure spring being mounted imprisoned on said threaded rod between said nut and said body.

Thus, in these known fasteners, said mechanism which is essentially formed of said threaded rod and said nut projects from the side opposite said elongate element. The result is then that the longitudinal dimension of said fasteners is appreciable. Since, in addition, the length of said threaded rod externally of said body corresponds to the thickness of the assembly of metal sheets to be assembled together, it can be seen that the fasteners provided for thick assemblies are very long.

Thus, very often, for reasons of available space, it is impossible to use pinning fasteners for thick assemblies and the temporary assembly must be formed by means of screws, nuts and washers. When the assembly of metal sheets is not accessible, simultaneously, from both sides by the same operator, which is for example the case when the wings of an aircraft are assembled to the fuselage thereof, two operators are then needed, respectively on each side of the assembly and forming said assembly by means of bolts and nuts.

SUMMARY OF THE INVENTION

The object of the present invention is to overcome these drawbacks. It relates to a pinning fastener whose length is small, even when it is provided for thick assemblies.

To this end, in accordance with the invention, the fastener for pinning together an assembly of metal sheets or similar, comprising:

a body defining a bearing face, intended to come into contact with the external face of one of said external metal sheets of said assembly, at least one elongate element intended to pass through facing holes formed in the metal sheets of said assembly and having an engagement nose, and a screw and nut mechanism for generating a relative movement in the longitudinal direction between said elongate element and said bearing face and, possibly, a transverse movement of said engagement nose, so that said metal sheets may be pressed between said bearing face and said engagement nose, which is then engaged behind the external face of the other external metal sheet of said assembly, at the edge of the corresponding hole, is remarkable in that said mechanism comprises a first core which may rotate and slide inside said body and has a threaded portion with which a second threaded core cooperates, to which said elongate element is secured.

Thus, the longitudinal dimension of the pinning fasteners is appreciably reduced.

Preferably, in order to maintain the clamping pressure constant, despite the relative movement of the metal sheets to be clamped together, which movement is related in particular to the slow creep of a sealing film which may be provided therebetween, it is advantageous for resilient means which may be mechanically deformed, such as a spring, to be disposed inside said body, between said first core and said bearing face. It will be noted that such an arrangement of said resilient means does not increase the size of said fastener.

Advantageously, to prevent said first core, which is rotary, from contacting said resilient means (fixed against rotation), a floating washer is inserted between said first core and said resilient means.

For readily actuating said fastener, an operating head is provided fast with said first core and projecting outside said body. In addition, means are provided for preventing rotation of said body.

At least one pin is advantageously provided for making said first core loosely prisoner with respect to the body.

In an advantageous embodiment, said fastener comprises at least two elongate elements formed by resilient blades or similar having opposite engagement noses, as well as a separator of said blades, connected to said bearing face. In this case, said mechanism is capable of generating simultaneously the longitudinal movement of said elongate elements and the transverse movements of said engagement noses.

BRIEF DESCRIPTION OF THE DRAWINGS

The figures of the accompanying drawings will better show how the invention may be implemented.

DESCRIPTION OF THE PREFERRED EMBODIMENTS

Figure 1:
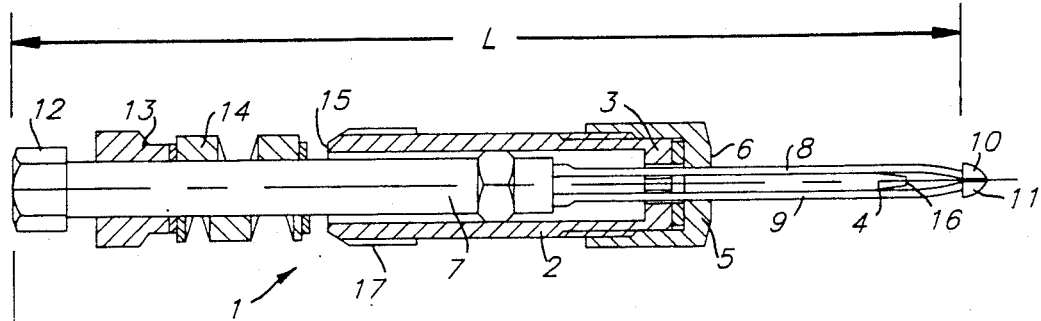
FIG. 1 is an axial sectional view of a pinning fastener of known type, in the expanded condition.

The known fastener for pinning an assembly of metal sheets together, shown in FIG. 1, comprises a hollow body 2 closed at one of its ends by a pierced bottom 3. A rod 4 is fast with bottom 3 and projects outwardly, on the side opposite said body 2. A cap 5 covers the end of body 2 adjacent bottom 3 and is made from a material not likely to mark the metal sheets. This cap 5 comprises a bearing face 6, covering said bottom 3.

Inside body 2 may slide a threaded rod 7 fast, at its end opposite bottom 3, with two resilient blades 8 and 9, provided respectively at their free ends with opposite engagement noses 10 and 11.

Said resilient blades 8 and 9 pass through bottom 3 and bearing face 6 and are disposed on each side of rod 4. Because of the form and resilience of these blades, noses 10 and 11 are spontaneously in contact with each other, when rod 4 is not disposed therebetween.

On the side opposite the resilient blades 8 and 9, the threaded rod 7 is provided with an operating head 12.

Furthermore, externally of the hollow body 2, a nut 13 is fitted on the threaded rod 7. A helical spring 14 is mounted on threaded rod 7, between nut 13 and body 2. The end of spring 14, opposite nut 13, can come to bear on the facing end 15 of said body 2.

When the fastener 1 of FIG. 1 is in the expanded position (position shown in this figure), the engagement noses 10 and 11 are in contact with each other, in front of the end 16 of rod 4 and spring 14 is not under pressure.

Now, if from this expanded position, a relative rotational movement is imparted between the operating head 12 and nut 13 (the body 2 being locked against rotation because for example of notches 17 formed in said body), the threaded rod 7 and so the resilient blades 8 and 9 are pulled leftwards of FIG. 1 and spring 14 is compressed between nut 13 and the end 15 of body 2. In addition, during the relative translational movement which results between body 2 and the resilient blades 8 and 9, the end 16 of rod 4 meets the engagement noses 10 and 11 and is inserted therebetween, while moving them apart. The separation of said engagement noses 10 and 11 then causes said resilient blades 8 and 9 to move radially apart. Conversely, in a reversible way, the expanded position may again be obtained by a relative rotation in the opposite direction between nut 13 and the operating head 12.

It will be readily understood that it is possible to clamp a stack of metal sheets (not shown) between the bearing face 6 and the separated engagement noses 10 and 11, after fitting the resilient blades 8 and 9 through a passage passing through said metal sheets. The clamping pressure is then provided and maintained by spring 14 compressed between nut 13 and the face 1 of body 2, even if a film of sealing material (not shown) is provided between said metal sheets.

It will however be noted that the longitudinal size L of fastener 1 is considerable, which, as was explained above, often makes the use of such a fastener impossible.

Figure 2:
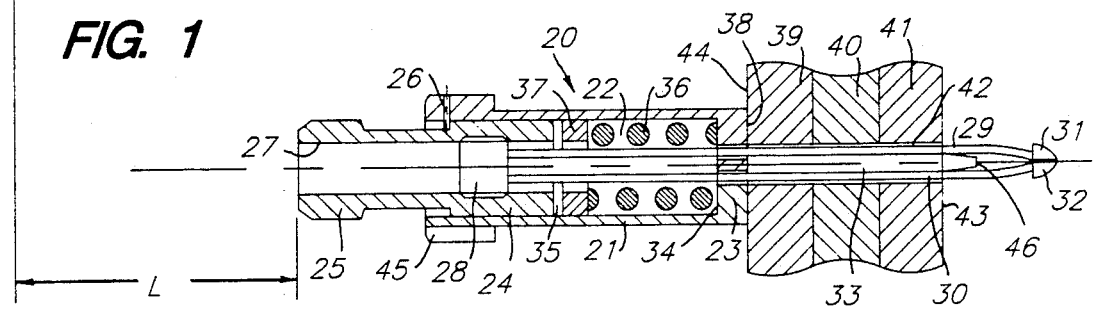
FIG. 2 is an axial sectional view of one embodiment of the pinning fastener of the invention, also in the expanded condition.
Figure 3:
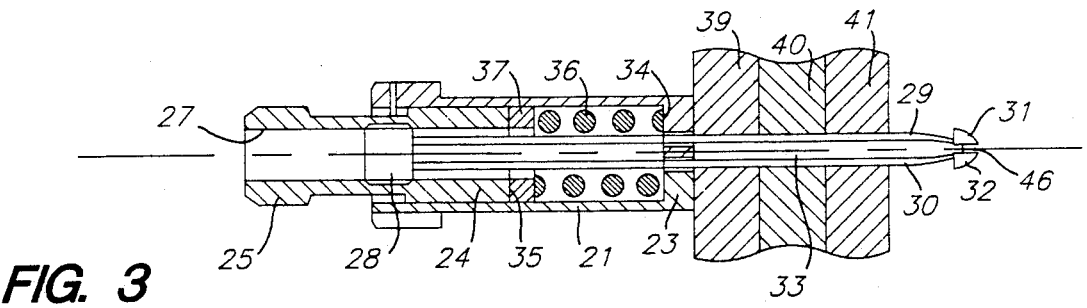
FIGS. 3 and 4 illustrate the pinning fastener of the invention in an intermediate pinning position and in the final pinning position.
Figure 4:
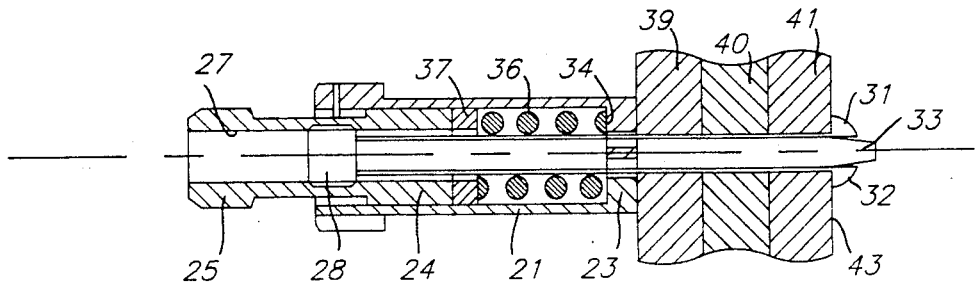

Fastener 20, in accordance with the invention and shown in FIGS. 2 to 4, overcomes this drawback.

This fastener 20 comprises a hollow body 21, whose internal wall 22 is cylindrical and is closed at one end by a transverse wall 23. Inside the hollow body 21 is disposed a first cylindrical core 24, with smooth external wall, which may rotate and slide with respect to the transverse wall 23. The cylindrical core 24 is accessible, from outside body 21, by means of an operating head 25 projecting through the end of said hollow body 21 opposite the transverse wall 23. A pin system 26 makes the cylindrical core 24 loosely prisoner of said body 21.

The cylindrical core 24 is pierced with a threaded longitudinal bore 27 in which a second threaded core 28 is engaged. The latter is fast with resilient blades 29 and 30, having engagement noses 31 and 32 at their ends. The resilient blades 29 and 30 and noses 31 and 32 are respectively similar to blades 8 and 9 and noses 10 and 11 described above. Blades 29 and 30 pass freely through bottom 23. A separation rod 33, similar to rod 4, is secured to bottom 23.

Between the internal face 34 of bottom 23 and the internal end 35 of the first core 24 is disposed a spring 36. A washer 37 may be provided between end 35 and spring 36.

The external face 38 of the transverse wall 23 may serve as bearing face for a stack of metal sheets. If required, it may be covered by a cap (not shown) similar to cap 5.

When it is desired to pin together a stack of metal sheets placed side by side 39, 40, 41, pierced with facing holes forming a through passage 42, fastener 20 is inserted in the expanded condition (see FIG. 2) in said passage 42 so that the engagement noses pass beyond the external face 43 of the external metal sheet 41 and so that the external face 38 of transverse wall 23 bears against the external face 44 of the external metal sheet 39.

Then, after locking body 21 against rotation, for example by means of notches 45 similar to notches 17 and provided at the end of body 21, the operating head 25 is actuated so that core 24 rotates in the direction in which core 28 is retracted into core 24. Consequently, noses 31 and 32 draw close to the end 46 of rod 33.

When, with rotation of core 24 continuing, said noses 31 and 32 meet said end 36 of rod 33, they move away from each other and move the resilient blades 29 and 30 radially away from each other (FIG. 3).

If rotation of core 24 is continued, noses 31 and 32 are pulled close to metal sheet 41 and simultaneously core 24 is drawn towards wall 23. Consequently, spring 36 is progressively compressed between washer 37 and the transverse wall 23 and noses 31 and 32 engage behind the edge of passage 42, in the external metal sheet 41 (FIG. 4). A constant clamping pressure, even in the case of a relative movement of the elements to be clamped together, is maintained by the action of spring 36. It will be noted that, for a similar clamping capacity, the fastener 20 of the invention has a longitudinal dimension less by 1 than the known fastener 1.

Of course, rotation in the opposite direction to the preceding one, will bring the fastener 20 into the condition shown in FIG. 2, for removing it from the assembly of metal sheets 30, 40, 41.

What is claimed is:

1. A fastener for pinning together an assembly of sheets having facing holes formed therethrough, comprising:
   (a) a hollow body having a bearing face to come into contact with said assembly, said bearing face having a hole therethrough;
   (b) a hollow first core able to freely rotate and slide inside said hollow body and having a threaded inner portion;

(c) a second threaded core cooperating with said threaded portion of the first core to which at least one elongate element is secured, said elongate element passing through said hole in said bearing face to pass through said facing holes in said sheets, said elongate element having an expandable engagement nose;

(d) spring means disposed inside said hollow body, between said first core and said bearing face;

(e) said first and second cores acting as a screw and nut mechanism for generating a relative movement between said elongate element and said bearing face and a transverse displacement of said engagement nose, so that said sheets are pressed between said bearing face and said engagement nose, via said spring means.

2. The fastener as claimed in claim 1, wherein a floating washer is inserted between said first core and said spring means.

3. The fastener as claimed in claim 1, wherein said first core comprises an operating head projecting outside said body.

4. The fastener as claimed in claim 1, wherein at least one pin is provided for making said first core loosely prisoner with respect to the body.

5. The fastener as claimed in claim 1, comprising at least two elongate elements formed by resilient blades or similar having opposite engagement noses, as well as a separator of said blades, connected to said bearing face.

6. A fastener for fastening together an assembly of rigid sheets having aligned apertures, comprising:

(a) a hollow body having bearing face for engagement with an assembly, said bearing face having an axial passage extending therethrough;

(b) a separation rod extending co-axially from said axial passage in the hollow body;

(c) a hollow first core rotatably and slidably disposed within the hollow body, said first core having an internally threaded bore;

(d) a second core having external threads and operatively engaging the internal threads of the first core;

(e) an elongate member extending axially from the second core and passing through the passage in the first core, said elongate member having an expandable engagement nose and adapted to pass through the appertures of an assembly of rigid sheets;

(f) spring biasing means disposed within the body and biasing the bearing face of the body and the first core;

wherein the first and second cores are disposed whereby rotation of the first core causes axial movement of the second core and elongate element with respect to the bearing face and wherein the axial movement causes the elongate member to engage with the separator rod to expand the nose of the elongate member whereby the expandable nose and the bearing face are spring biased against the assembly.

* * * * *